(12) United States Patent
Freyermuth et al.

(10) Patent No.: US 8,656,573 B2
(45) Date of Patent: Feb. 25, 2014

(54) SHRINK-FIT TOOL WITH MECHANICAL RETENTION MEMBER, AND METHOD OF MOUNTING A TOOL TO A TOOLHOLDER

(75) Inventors: Alain Freyermuth, Pfaffenhoffen (FR); Marcel Aarts, Lottum (NL)

(73) Assignee: Seco Tools AB, Fagersta (SE)

( * ) Notice: Subject to any disclaimer, the term of this patent is extended or adjusted under 35 U.S.C. 154(b) by 813 days.

(21) Appl. No.: 12/525,824

(22) PCT Filed: Jan. 14, 2008

(86) PCT No.: PCT/SE2008/050040
§ 371 (c)(1),
(2), (4) Date: Oct. 5, 2010

(87) PCT Pub. No.: WO2008/097171
PCT Pub. Date: Aug. 14, 2008

(65) Prior Publication Data
US 2011/0193299 A1 Aug. 11, 2011

(30) Foreign Application Priority Data
Feb. 8, 2007 (SE) ........................................ 0700316

(51) Int. Cl.
*B23B 31/107* (2006.01)
*B23B 31/10* (2006.01)
*B23P 11/02* (2006.01)

(52) U.S. Cl.
CPC ......... *B23P 31/1179* (2013.01); *B23P 31/1072* (2013.01); *B23P 11/027* (2013.01)
USPC ............ 29/447; 279/97; 279/102; 408/239 R; 409/234

(58) Field of Classification Search
CPC .............. B23B 31/008; B23B 31/1072; B23B 31/1179; B23P 11/027
USPC ........... 29/447; 279/97, 102, 103; 408/239 R; 409/234
IPC ...................... B23B 31/107,31/10; B23P 11/02
See application file for complete search history.

(56) References Cited

U.S. PATENT DOCUMENTS

| 271,143 A | * | 1/1883 | Smith | 403/287 |
| 2,731,273 A | * | 1/1956 | Edens | 279/81 |

(Continued)

FOREIGN PATENT DOCUMENTS

| EP | 1541265 A2 | 6/2005 |
| JP | 2002355727 A1 | 12/2002 |

(Continued)

OTHER PUBLICATIONS

International Search Report from corresponding International Application PCT/SE2008/050040.

*Primary Examiner* — Eric A Gates
(74) *Attorney, Agent, or Firm* — WRB-IP LLP

(57) ABSTRACT

A shrink-fit tool (21) includes a tool and a toolholder, one of the tool (23) and the toolholder (25) having a male shank portion (27) and the other one of the tool (23) and the toolholder (25) having a body portion (29) including female opening (31) for receiving the shank portion (27), the female opening (31) being adapted to change in size upon heating the body portion (29) to receive the shank portion (27) and upon cooling of the body portion (29) to clamp the shank portion (27) by an interference fit. The shrink-fit tool (21) also includes a mechanical retention member (33) disposed between the shank portion (27) and the body portion (29) for mechanically retaining the shank portion (27) in the female opening (31) so that the shank portion (27) is in its only predetermined orientation relative to the body portion (29).

11 Claims, 2 Drawing Sheets

(56) References Cited

U.S. PATENT DOCUMENTS

| | | | | |
|---|---|---|---|---|
| 2,801,860 | A * | 8/1957 | Getts | 279/97 |
| 4,832,546 | A * | 5/1989 | Potemkin | 409/234 |
| 6,340,274 | B1 * | 1/2002 | Shimomura et al. | 407/34 |
| 6,394,466 | B1 * | 5/2002 | Matsumoto et al. | 279/103 |
| 6,871,859 | B2 * | 3/2005 | Lundblad et al. | 279/102 |
| 7,077,608 | B2 * | 7/2006 | Hartman | 409/234 |
| 2004/0160020 | A1 | 8/2004 | Irion et al. | |
| 2005/0238451 | A1 | 10/2005 | Hartman | |

FOREIGN PATENT DOCUMENTS

| | | |
|---|---|---|
| JP | 2004017213 A | 1/2004 |
| JP | 2004058176 A | 2/2004 |

* cited by examiner

SHRINK-FIT TOOL WITH MECHANICAL RETENTION MEMBER, AND METHOD OF MOUNTING A TOOL TO A TOOLHOLDER

BACKGROUND AND SUMMARY

The present invention relates to shrink-fit tools and, more particularly, to shrink-fit tools with mechanical retention members.

Conventional toolholding arrangements involve mechanical chucks and the like for holding shanks of rotating tools such as milling, drilling, and boring tools, and for holding shanks or other portions of turning tools. In some circumstances, an alternative to a mechanical chuck is desired. It is also known to secure tools relative to toolholders by a shrink-fit technique whereby the toolholder is heated so that a tool-receiving opening in the toolholder expands sufficiently to receive a part, such as a shank, of the tool. When the toolholder cools, the opening in the toolholder contracts and the tool is secured in the opening by an interference fit. JP 2002-355727 discloses a shrink fit tool with a pin engaging groove 10 and a flat surface member 9 at 90° to the pin engaging groove 10. A 90° corner is disposed between the pin engaging groove 10 and the flat surface member 9.

An aspect of the present invention addresses a problem with shrink-fit tools in which the tool tends to creep outwardly relative to the toolholder. For example, in shrink-fit tools using tools with positive axial angles, such as solid end milling cutters, due to pulling and twisting forces on the tool, the tool moves outwardly relative to the toolholder. This can adversely affect the accuracy of a machining operation performed with the shrink-fit tool.

It is desirable to provide a shrink-fit tool that can reduce problems associated with tool creep in shrink-fit tools.

According to an aspect of the present invention, a shrink-fit tool comprises a tool and a toolholder, one of the tool and the toolholder having a male shank portion and the other one of the tool and the toolholder having a body portion including female opening for receiving the shank portion, the female opening being adapted to change in size upon heating the body portion to receive the shank portion and upon cooling of the body portion to clamp the shank portion by an interference fit, the shrink-fit tool comprising a pin adapted to extend into the female opening in a direction lateral to an axis of the female opening for mechanically retaining the shank portion in the female opening, the shank portion comprising a lateral recess extending laterally to an axis of the shank portion, the shank portion comprising an axially extending recess, an end of the axially extending recess being disposed at an end of the shank portion, and the lateral recess being disposed remote from the end of the shank portion and connected to and at least partially circumferentially offset from the axially extending recess, wherein the shrink-fit tool is part of a rotating tool arranged for cutting a workpiece when rotated in a first direction about the axis of the shank portion, a recessed, curved transition region of constant depth being provided between the lateral recess and the axially extending recess, the lateral recess and the axially extending recess being of sufficient depth such that rotation of the shrink-fit tool in the first direction during a cutting operation tends to urge the pin into the lateral recess so that the shank portion is mechanically retained in the female opening and, when the shank portion is rotated relative to the female opening of the body portion in a second direction opposite to the first direction, the pin is adapted to be received in the axially extending recess so that the shank portion is adapted to be withdrawn from the female opening of the body portion.

According to another aspect of the present invention, a method of mounting a tool to a toolholder comprises heating a body portion including female opening for receiving a shank portion so that the female opening changes in size to permit insertion of the shank portion, the shank portion comprising an axially extending recess, an end of the axially extending recess being disposed at an end of the shank portion, and a lateral recess disposed remote from the end of the shank portion and at least partially circumferentially offset from the axially extending recess and connected to the axially extending recess by a recessed, curved transition region of constant depth; cooling the body portion to clamp the shank portion in the female opening by an interference fit; restraining axial movement of the shank portion relative to the body portion with a pin disposed in the lateral recess in the shank portion and in an opening in the body portion; rotating the shank portion relative to the female opening of the body portion, with the pin in the opening in the body portion, so that the pin moves from a position in which the pin aligns with the axially extending recess to a position in which the pin aligns with the lateral recess and axial movement of the shank portion is thereby restrained; and rotating the shank portion relative to the female opening of the body portion, with the pin in the opening in the body portion, so that the pin moves from the position in which the pin aligns with the lateral recess to the position in which the pin aligns with the axially extending recess and withdrawing the shank portion from the female opening of the body portion.

According to yet another aspect of the present invention, a tool for a shrink-fit tool assembly is disclosed and comprises a tool having a male shank portion adapted to be received in a female opening of a toolholder, the female opening being adapted to change in size upon heating the body portion to receive the shank portion and upon cooling of the body portion to clamp the shank portion by an interference fit, the tool comprising a recess for receiving part of a pin disposed between the shank portion and the body portion for mechanically retaining the shank portion in the female opening, the shank portion comprises a lateral recess extending laterally to an axis of the shank portion, the pin being adapted to extend into the lateral recess, and the shank portion comprises an axially extending recess, an end of the axially extending recess being disposed at an end of the shank portion, and the lateral recess being disposed remote from the end of the shank portion and at least partially circumferentially offset from the axially extending recess and connected to the axially extending recess by a recessed, curved transition region of constant depth.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
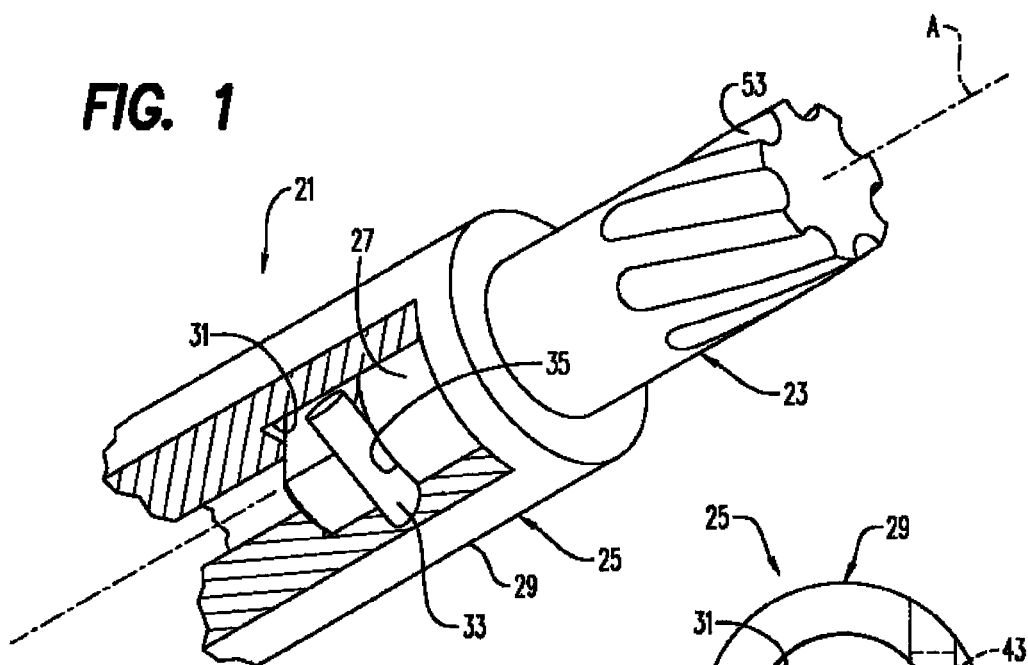
FIG. 1 is a perspective, partially broken view of a shrink-fit tool according to an embodiment of the present invention.
Figure 3C:
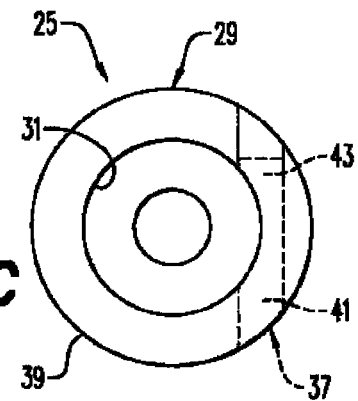
FIGS. 3A-3C are, respectively, a side view, a side cross-sectional view, taken through section 3B-3B of FIG. 3A, and a top view of a toolholder according to an embodiment of the present invention.
Figure 3A:
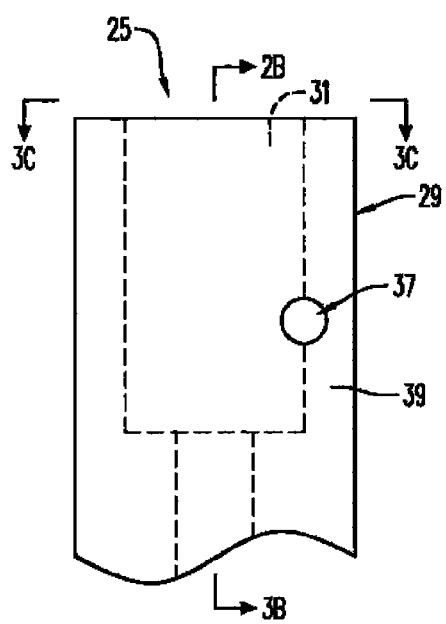
Figure 3B:
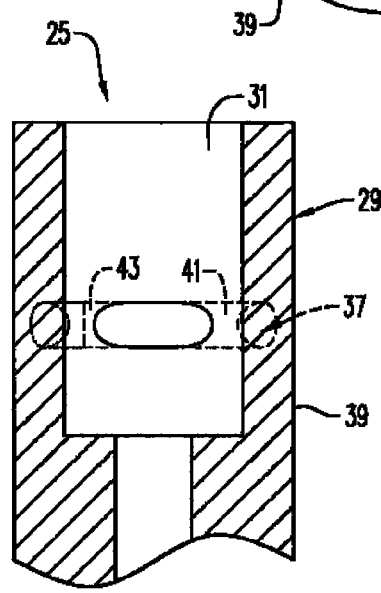
Figure 2A:
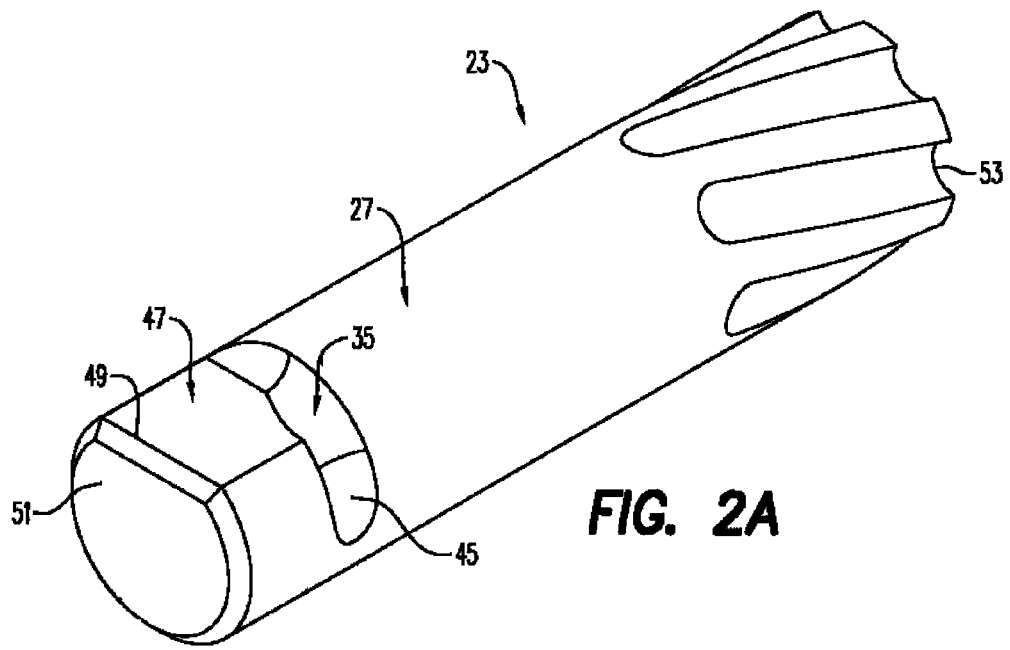
FIGS. 2A-2C are, respectively, a perspective view, a side view, and a cross-sectional view, taken through section 2C-2C of FIG. 2B, of a tool according to an embodiment of the present invention.
Figure 2B:
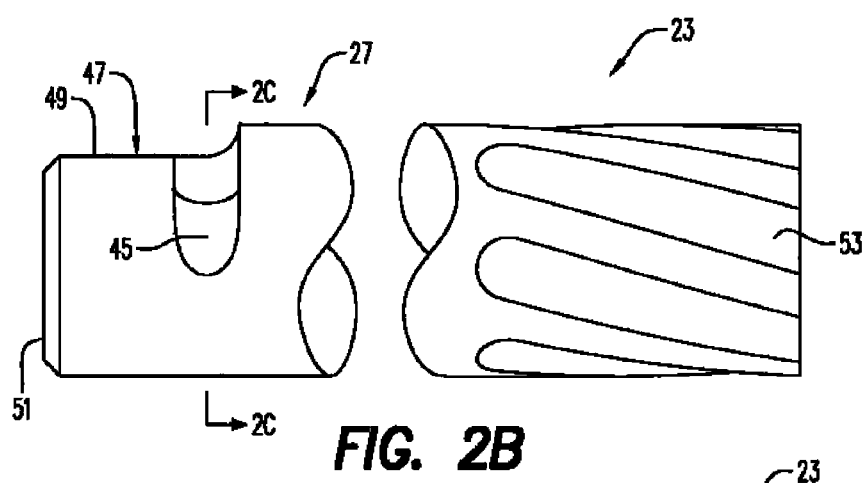
Figure 2C:
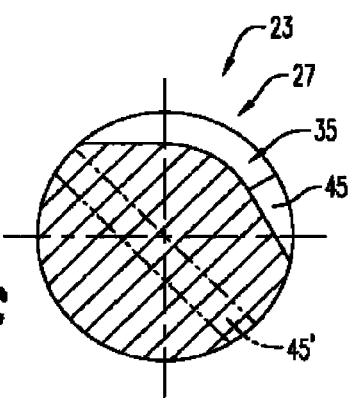

A shrink-fit tool 21 according to an embodiment of the present invention is shown in FIG. 1. The shrink-fit tool 21 comprises a tool 23, an embodiment of which is seen in FIGS. 2A-2C, and a toolholder 25, an embodiment of which is seen in FIGS. 3A-3C. One of the tool 23 and the toolholder 25 have a male shank portion 27—in the illustrated embodiments, the tool 23 has the male shank portion 27—and the other one of the tool and the toolholder have a body portion 29 including female opening 31 for receiving the shank portion—in the illustrated embodiments, the toolholder has a body portion with a female opening. As in known shrink-fit tools, the female opening 31 is adapted to change in size upon heating the body portion 29 to receive the shank portion 27 and upon cooling of the body portion is adapted to clamp the shank portion by an interference fit. The shank 27 and the female opening 31 will ordinarily be of complementary shapes, and will ordinarily be circularly cylindrical or tapered over their lengths.

A mechanical retention member 33 (FIG. 1) is disposed between the shank portion 27 and the body portion 29 for mechanically retaining the shank portion in the female opening 31. Ordinarily, at least one of the shank portion 27 and the body portion 29 has a recess for receiving part of the mechanical retention member 33. In the illustrated embodiments, both of the shank portion 27 and the body portion 29 have a recess 35 and 37, respectively, for receiving part of the mechanical retention member 33.

As seen in FIGS. 3A-3C, the recess 37 in the body portion comprises a hole extending from an outer surface 39 of the body portion and opening into the female opening 31. A mechanical retention member 33 in the form of a pin, bolt, set screw, ball, or the like is adapted to extend into or through the hole into the female opening 31 and into the recess 35 in the shank portion 27. In the embodiment of FIGS. 3A-3C, the hole comprises a first portion 41 extending from the outer surface 39 of the body portion 29 and opening into the female opening 31, and a second portion 43 extending from the female opening into the body portion. The second portion 43 of the hole can extend to the outer surface 39 of the body portion 29 (as shown in phantom) or, can stop short of extending to the outer surface of the body portion so that the mechanical retention member 33 bottoms out against a bottom of the second portion of the hole.

As seen in FIGS. 2A-2C, the shank 27 can comprise a hole into which the mechanical retention member 33 (hereinafter referred to generically as a "pin") extends. The hole can be a through hole 45' (as shown in phantom in FIG. 2C) but is preferably in the form of a lateral recess 45 extending laterally to an axis A of the shank 27, and the pin can extend into and, ordinarily, through the lateral recess.

The shank 27 can also comprise an axially extending recess 47. An end 49 of the axially extending recess 47 can be disposed at an end 51 of the shank 27, and the lateral recess 45 can be disposed remote from the end of the shank and connected to and at least partially circumferentially offset from the axially extending recess. Thus, when the shrink-fit tool 21 is part of, for example, a rotating tool arranged for cutting a workpiece when rotated in a first direction about the axis A of the shank, the lateral recess 45 and the axially extending recess 47 can be formed such that rotation of the shrink-fit tool in the first direction during the cutting operation tends to urge the pin 33 into the lateral recess 45, i.e., a bayonet-type lock. When the shank 27 is rotated relative to the female opening 31 of the body 29 in a second direction opposite to the first direction, the pin 33 is adapted to align with the axially extending recess 47 and the shank is adapted to be withdrawn from the female opening of the body when the female opening is expanded through heating.

Ordinarily, the mechanical retention member 33 can only be received in both the recess 35 and the recess 37 when the shank 27 is in a desired position relative to the body portion 29. More particularly, the shank 27 must be in single predetermined orientation relative to the body portion 29 for the mechanical retention member to be received in both the recess 35 and the recess 37 comprises a single working position, i.e., the shank portion is in its only predetermined orientation relative to the body portion. The single predetermined orientation of the shank 27 relative to the body portion 29 can comprise a single working position, such as when the shank 27 is turned so that the mechanical retention member 33 contacts a wall of the recess 35 when a load is applied to the shank, such as during a machining operation. The single predetermined orientation of the shank 27 relative to the body portion 29 may, however, comprise all orientations within a range of angular orientations of the shank relative to the body portion, such as a range of positions between a first position in which the mechanical retention member 33 contacts a wall of the recess 35 and the working position. In other embodiments, such as the embodiment with a through hole 45' shown in FIG. 2C, the shank 27 may have a single predetermined orientation relative to the body portion 29 which is also the single working position, and it may not be possible for the shank to be moved out of the working position to other angular orientations relative to the body portion. In this way, precise control of the location of the cutting edges of a tool relative to the body portion can be ensured.

The present invention is believed to be particularly useful in connection with securing tools 23 formed of cemented carbide in toolholders 25. Many modern tools formed entirely of cemented carbide are often small and shrink-fit retention arrangements can be particularly useful in retaining smaller tools. Of course, the tool 23 can be formed of any suitable material. The tool 23 can comprise at least one integral cutting edge 53 and, usually, comprises a plurality of integral cutting edges. The tool 23 can, however, comprise cutting inserts (not shown) for forming replaceable and/or indexable cutting edges, which may be preferable in some circumstances, particularly for larger tools where the cutting inserts can be formed of a material such as cemented carbide and the tools can be formed of another, more easily machined material In a method of mounting a tool 23 to a toolholder 25 according to an aspect of the present invention, the body portion 29 including the female opening 31 for receiving a shank portion 27 is heated so that the female opening changes in size to permit insertion of the shank portion. The body portion 29 is cooled to clamp the shank portion 27 in the female opening 31 by an interference fit. Axial movement of the shank portion 27 relative to the body portion 29 is restrained with a mechanical retention member 33 disposed between the shank portion and the body portion.

The shank 27 can comprise the axially extending recess 47, an end 49 of the axially extending recess can be disposed at the end 51 of the shank, and the lateral recess 45 can be disposed remote from the end of the shank and connected to and at least partially circumferentially offset from the axially extending recess. The shank 27 can be rotated relative to the female opening 31 of the body 29 so that the mechanical retention member 33 aligns with the axially extending recess 47 and the shank can be withdrawn from the female opening of the body.

By providing the claimed combination of features including a recessed, curved transition region of constant depth, it is possible to make the recesses 45 and 47 shallower than if the transition is sharp. In this way, less material needs to be removed from the shank 27, and the shank can have greater strength. Independent claim 10 recites a combination of steps for mounting a tool to a toolholder and involving a shank portion. By performing the claimed steps involving the shank portion, the tool mounting can have greater strength because a minimal amount of material needs to be removed from the shank to form the lateral recess and the axially extending recess and the transition between them.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

The disclosures in Swedish patent application No. 0700316-3, from which this application claims priority, are incorporated herein by reference.

While this invention has been illustrated and described in accordance with a preferred embodiment, it is recognized that variations and changes may be made therein without departing from the invention as set forth in the claims.

The invention claimed is:

1. A shrink-fit tool, comprising a tool and a toolholder, one of the tool and the toolholder having a male shank portion and the other one of the tool and the toolholder having a body portion including a female opening for receiving the shank portion, the female opening being adapted to change in size upon heating the body portion to receive the shank portion and upon cooling of the body portion to clamp the shank portion by an interference fit, the shrink-fit tool comprising a pin adapted to extend into the female opening in a direction lateral to an axis of the female opening for mechanically retaining the shank portion in the female opening, the shank portion comprising a lateral recess extending laterally to an axis of the shank portion, the shank portion comprising an axially extending recess, an end (49) of the axially extending recess being disposed at an end of the shank portion, and the lateral recess being disposed remote from the end of the shank portion and connected to and at least partially circumferentially offset from the axially extending recess, wherein the shrink-fit tool is part of a rotating tool arranged for cutting a workpiece when rotated in a first direction about the axis of the shank portion, wherein a recessed, curved transition region of constant depth is provided between the lateral recess and the axially extending recess, the lateral recess and the axially extending recess being of sufficient depth such that rotation of the shrink-fit tool in the first direction during a cutting operation tends to urge the pin into the lateral recess so that the shank portion is mechanically retained in the female opening and, when the shank portion is rotated relative to the female opening of the body portion in a second direction opposite to the first direction, the pin is adapted to be received in the axially extending recess so that the shank portion is adapted to be withdrawn from the female opening of the body portion.

2. The shrink-fit tool as set forth in claim 1, wherein the body portion has a hole extending from an outer surface of the body portion and opening into the female opening, the pin being adapted to extend into the hole, into the female opening, and into the recess in the shank portion.

3. The shrink-fit tool as set forth in claim 2, wherein the hole comprises a first portion extending from the outer surface of the body portion and opening into the female opening, and a second portion extending from the female opening into the body portion.

4. The shrink-fit tool as set forth in claim 3, wherein the second portion of the hole extends to the outer surface of the body portion.

5. The shrink-fit tool as set forth in claim 1, wherein the tool is formed of cemented carbide.

6. The shrink-fit tool as set forth in claim 5, wherein the tool comprises at least one integral cutting edge.

7. The shrink-fit tool as set forth in claim 1, wherein the tool comprises the male shank portion and the toolholder comprises the body portion.

8. The shrink-fit tool as set forth in claim 7, wherein the single predetermined orientation of the shank portion relative to the body portion comprises all orientations within a range of relative angular orientations.

9. The shrink-fit tool as set forth in claim 1, wherein a depth of a recessed region connecting the lateral recess and the axially extending recess is constant.

10. A method of mounting a tool to a toolholder, comprising: heating a body portion including female opening for receiving a shank portion so that the female opening changes in size to permit insertion of the shank portion, the shank portion comprising an axially extending recess, an end of the axially extending recess being disposed at an end of the shank portion, and a lateral recess disposed remote from the end of the shank portion and at least partially circumferentially offset from the axially extending recess and connected to the axially extending recess by a recessed, curved transition region of constant depth; cooling the body portion to clamp the shank portion in the female opening by an interference fit; restraining axial movement of the shank portion relative to the body portion with a pin disposed in the lateral recess in the shank portion and in an opening in the body portion; rotating the shank portion relative to the female opening of the body portion, with the pin in the opening in the body portion, so that the pin moves from a position in which the pin aligns with the axially extending recess to a position in which the pin aligns with the lateral recess and axial movement of the shank portion is thereby restrained, and rotating the shank portion relative to the female opening of the body portion, with the pin in the opening in the body portion, so that the pin moves from the position in which the pin aligns with the lateral recess to the position in which the pin aligns with the axially extending recess and withdrawing the shank portion from the female opening of the body portion.

11. A tool for a shrink-fit tool assembly, comprising a tool having a male shank portion adapted to be received in a female opening of a toolholder, the female opening being adapted to change in size upon heating the body portion to receive the shank portion and upon cooling of the body portion to clamp the shank portion by an interference fit, the tool comprising a recess for receiving part of a pin disposed between the shank portion and the body portion for mechanically retaining the shank portion in the female opening, the shank portion comprises a lateral recess extending laterally to an axis of the shank portion, wherein the pin is adapted to extend into the lateral recess, and the shank portion comprises an axially extending recess, an end of the axially extending recess being disposed at an end of the shank portion, and the lateral recess being disposed remote from the end of the shank portion and at least partially circumferentially offset from the axially extending recess and connected to the axially extending recess by a recessed, curved transition region of constant depth.

* * * * *